US006179431B1

(12) United States Patent
Chien

(10) Patent No.: US 6,179,431 B1
(45) Date of Patent: Jan. 30, 2001

(54) FLASHLIGHT WITH ELECTRO-LUMINESCENT ELEMENT

(76) Inventor: Tseng-Lu Chien, 8F, No. 29, Alley 73, Lin-Shen Road, Shi-Chi Town, Taipei Hseng (TW)

( * ) Notice: Under 35 U.S.C. 154(b), the term of this patent shall be extended for 0 days.

(21) Appl. No.: 09/220,368

(22) Filed: Dec. 24, 1998

(51) Int. Cl.$^7$ .................................................... F21K 2/08
(52) U.S. Cl. ............................ 362/84; 362/184; 362/208; 362/802
(58) Field of Search ................................... 362/157, 208, 362/227, 84, 184, 802

(56) References Cited

U.S. PATENT DOCUMENTS

| 2,809,316 | 10/1957 | Jeges . | |
|---|---|---|---|
| 3,056,697 | 10/1962 | Belfort . | |
| 3,061,716 | 10/1962 | Benander | 362/95 |
| 3,307,030 | 2/1967 | De Francisco | 362/95 |
| 3,796,869 | * 3/1974 | Stone | 362/84 |
| 4,138,628 | 2/1979 | Smith | 315/368 |
| 4,425,600 | * 1/1984 | Barnhart | 362/208 X |
| 4,546,416 | * 10/1985 | Pemberton | 362/84 |
| 4,664,473 | 5/1987 | Gannon | 350/96.33 |
| 4,876,632 | * 10/1989 | Osterhout et al. | 362/208 X |
| 4,927,376 | 5/1990 | Dickie | 439/484 |
| 5,469,342 | 11/1995 | Chien | 362/84 |
| 5,572,817 | 11/1996 | Chien | 40/544 |
| 5,599,088 | 2/1997 | Chien | 362/103 |
| 5,601,358 | 2/1997 | Chien | 362/190 |
| 5,611,621 | 3/1997 | Chien | 362/84 |
| 5,667,394 | 9/1997 | Chien | 439/86 |
| 5,667,736 | 9/1997 | Chien | 264/2.5 |
| 5,683,164 | 11/1997 | Chien | 362/78 |
| 5,688,038 | 11/1997 | Chien | 362/103 |
| 5,704,705 | 1/1998 | Chien | 362/84 |
| 5,720,651 | 2/1998 | Chien | 446/34 |
| 5,722,757 | 3/1998 | Chien | 362/32 |
| 5,722,760 | 3/1998 | Chien | 362/84 |
| 5,746,500 | 5/1998 | Chien | 362/103 |
| 5,746,501 | 5/1998 | Chien | 362/103 |
| 5,752,337 | 5/1998 | Chien | 40/540 |
| 5,754,064 | 5/1998 | Chien | 327/108 |
| 5,775,016 | 7/1998 | Chien | 40/544 |
| 5,806,960 | 9/1998 | Chien | 362/84 |
| 5,806,961 | 9/1998 | Dalton et al. | 362/183 |
| 5,929,571 | * 7/1999 | Pauly | 362/84 X |

* cited by examiner

Primary Examiner—Laura K. Tso

(57) ABSTRACT

A flashlight having a housing, a conventional light source such as an incandescent bulb, krypton, halogen, or mercury vapor lamp, fluorescent tube, cold cathode tube, or light emitting diode, and at least one electro-luminescent lighting element, so that the flashlight can emit light of different intensities and power consumption and therefore serve not only as a conventional flashlight but also, by way of example, as a night light, warning beacon, or light stick.

20 Claims, 5 Drawing Sheets

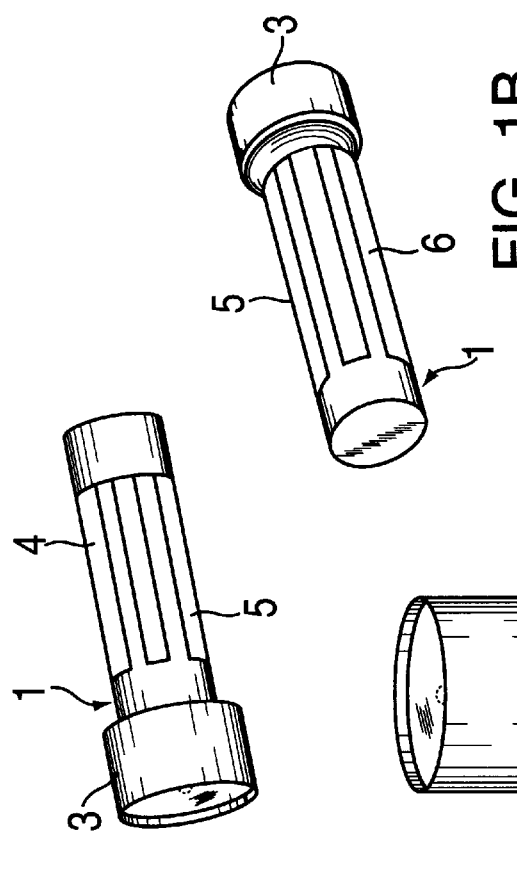
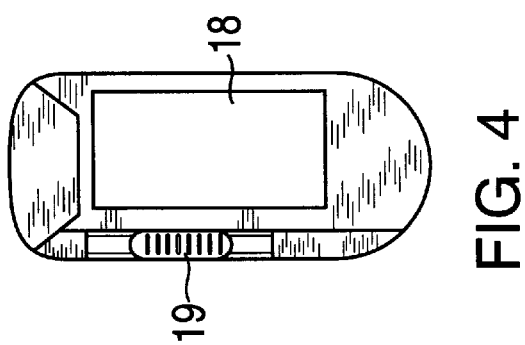
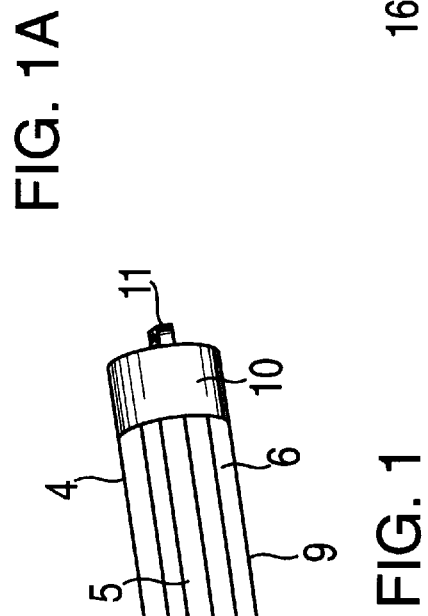
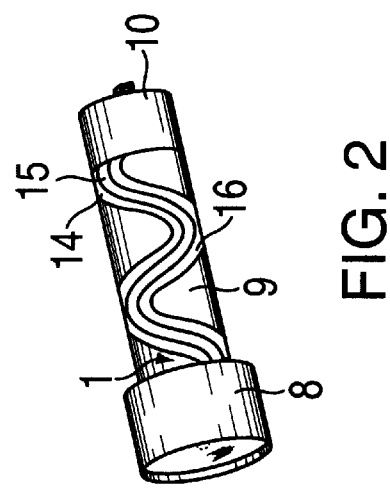

FLASHLIGHT WITH ELECTRO-LUMINESCENT ELEMENT

BACKGROUND OF THE INVENTION

1. Field of the Invention

This invention relates to a flashlight, and in particular to a flashlight including a conventional light source such as an incandescent bulb, krypton, halogen, xenon, or mercury vapor lamp, fluorescent tube, cold cathode tube, or light emitting diode, and at least one electro-luminescent lighting element, so that the flashlight can emit light of different intensities and power consumption and therefore serve not only as a conventional flashlight but also, by way of example, as a night light, warning beacon, or light stick.

2. Discussion of Related Art

Conventionally, flashlights have included only a single light source and are not convenient, even with the inclusion of a tile angle lens or the like, for such applications as area illumination. In addition, even if the conventional flashlight could be used for area illumination, the power consumption of the conventional flashlight prevents it from being used for such purposes for an extended period of time. Essentially, in the conventional flashlight, a tradeoff must be made between providing a high intensity beam and reducing power consumption. The present invention modifies the conventional flashlight by adding an electro-luminescent lighting arrangement to a flashlight that also includes a conventional light source, thus enabling the flashlight to provide both high intensity lighting and lighting at lower intensities with lower power consumption.

Electro-luminescent lighting arrangements have been proposed for use in a variety of specific contexts, including illumination of footwear, headwear, backpacks, safety guides, moving objects, flying objects, containers, timepieces, and audio equipment, because of their flexibility and low power consumption, and their relative brightness, color choice, and wide viewing angle in comparison with other low power consumption devices such as LEDs.

In U.S. Pat. No. 5,806,960, incorporated herein by reference, and its continuation, U.S. patent application Ser. No. 08/998,767, filed Dec. 29, 1997, the Inventor proposes modification of a conventional safety light or flashlight by substituting an electro-luminescent element for the traditional light source to obtain such advantages as decreased power consumption and increased design flexibility with respect to color choice, brightness, lighting effects such as flashing or sequencing, and decorative non-illuminated effects. Although the brightness of a flashlight that uses electro-luminescent elements instead of the conventional light source may be sufficient for many applications, electro-luminescent elements in general are not as bright as incandescent, krypton, halogen, or similar bulbs of the type conventionally used in flashlights, which are intended to focus a relatively high intensity light beam on a relatively small area. As a result, the present invention proposes to combine a conventional high intensity flashlight with a lower power, lower intensity lighting arrangement that can nevertheless be used in wide area or surface illumination applications for which a conventional flashlight is ill suited.

A concept similar to that of the present invention is disclosed in copending U.S. patent application Ser. No. 09/158,503, filed Sep. 18, 1993 and also incorporated herein by reference. In this copending application, the Inventor proposes to combine an electro-luminescent element with at least one other type of light source to provide different light qualities for different conditions. The present invention applies the concept described in U.S. patent application Ser. No. 09/158,503 to the specific context of flashlights, and in particular to flashlights having a conventional light source such as an incandescent bulb, krypton, xenon, or halogen bulb, mercury vapor lamp, fluorescent tube, cold cathode tube, light emitting diode, or other lighting element suitable for use in flashlights.

A flashlight having two different types of light sources is described in U.S. Pat. No. 5,806,961. The primary light source is a conventional lighting element while the second light source is said to provide a night light function but is powered by DC current from a rechargeable battery. Unlike the electro-luminescent elements of the present invention, which can be driven directly by an AC power supply, because the second light source of U.S. Pat. No. 5,806,961 is DC powered, relatively expensive driver circuitry is required and yet the disclosed circuitry provides none of the enhanced lighting effects described above. An LED of the type described in this patent as a suitable second light source is too dim and has too narrow a viewing angle to provide effective surface or area illumination, particularly in relation to the space occupied by the LED and support structure (a minimum area of 10 mm×3 mm is generally required). As a result, the flashlight of U.S. Pat. No. 5,806,961 is not practical for use as a secondary source of surface/area illumination, and a need still exists for a device that serves both as a flashlight to provide high intensity lighting and as a source of wide area illumination at lower intensities and power levels.

SUMMARY OF THE INVENTION

It is accordingly an objective of the invention to provide a flashlight that is capable of providing a high intensity beam and lower power, lower intensity illumination that can be viewed over a large area.

It is a further objective of the invention to provide a lighting apparatus which includes a flashlight that can also serve as wide area relatively low intensity lighting application such as a night light, light stick, warning beacon, and so forth, without unduly increasing the cost or complexity of the electrical connection, presenting safety hazards, or significantly increasing power consumption.

It is yet another objective of the invention to provide a combined flashlight and electro-luminescent lighting arrangement which provides a variety of decorative lighting effects in addition to the conventional flashlight beam, including decorative lighting shapes and lighting effects such as flashing, chasing, etc., at a reasonable cost.

These objectives are achieved, in accordance with the principles of a first preferred embodiment of the invention by providing a flashlight having a housing, a conventional light source such as an incandescent bulb, krypton, halogen, or mercury vapor lamp, fluorescent tube, cold cathode tube, or light emitting diode, and at least one electro-luminescent lighting element, so that the flashlight can emit light of different intensities and power consumption and therefore serve not only as a conventional flashlight but also, by way of example, as a night light, warning beacon, or light stick.

Those skilled in the art will appreciate that the flashlight of the invention may take a variety of forms including, as described below, a traditional flashlight which can also be used as a light stick, a torch light with an air compressor, battery charger, radio, or other built-in devices, a power failure backup light, a traffic baton, a key chain light, or a portable reading light.

In addition, the power circuitry used in the flashlights of the preferred embodiments of the invention may take a variety of forms, from direct connection to an AC power source to simple DC power supplies and integrated circuit based function interfaces that enable the lighting elements to exhibit a variety of different flashing or motion effects.

The invention greatly increases the versatility of the conventional flashlight. While a (conventional flashlight can be used to provide bright light for walking in a dark environment or for finding something, a krypton or equivalent bulb uses a relatively large amount of power, so that the batteries of the flashlight can last only a short time. For example, a krypton bulb will drain 600 mA/hr at 4.5 volts.

In contrast, electro-luminescent elements have much lower power consumption, a 0.6 by 9.0 inch strip drawing only 30 mA/hr at 4.5 volts, while still providing light of sufficient brightness to provide visibility in dark areas, which is perfect for camping, power fail indication, and similar applications.

The use of sequencing or flasher circuits and multiple electro-luminescent elements greatly enhances the visibility of the flashlight itself, allowing use by road workers or police as a traffic baton while still providing flashlight functions. Because electro-luminescent elements can be made flexible, they can be used on virtually any shape of housing, and if mounted on a curved surface, provides a power saving lighting arrangement that can be viewed over a wide viewing angle.

It will of course be understood by those skilled in the art that the present invention may be applied to any type of conventional flashlight apparatus, and that details of the electrical connections and power circuitry may be varied in innumerable ways without departing from the scope of the invention.

BRIEF DESCRIPTION OF THE DRAWINGS

FIG. 1 is an isometric view of a flashlight constructed in accordance with the principles of a first preferred embodiment of the invention.

FIGS. 1A, 1B, and 2–4 are isometric views of variations of the flashlight illustrated in FIG. 1.

DETAILED DESCRIPTION OF THE PREFERRED EMBODIMENTS

Figure 5:
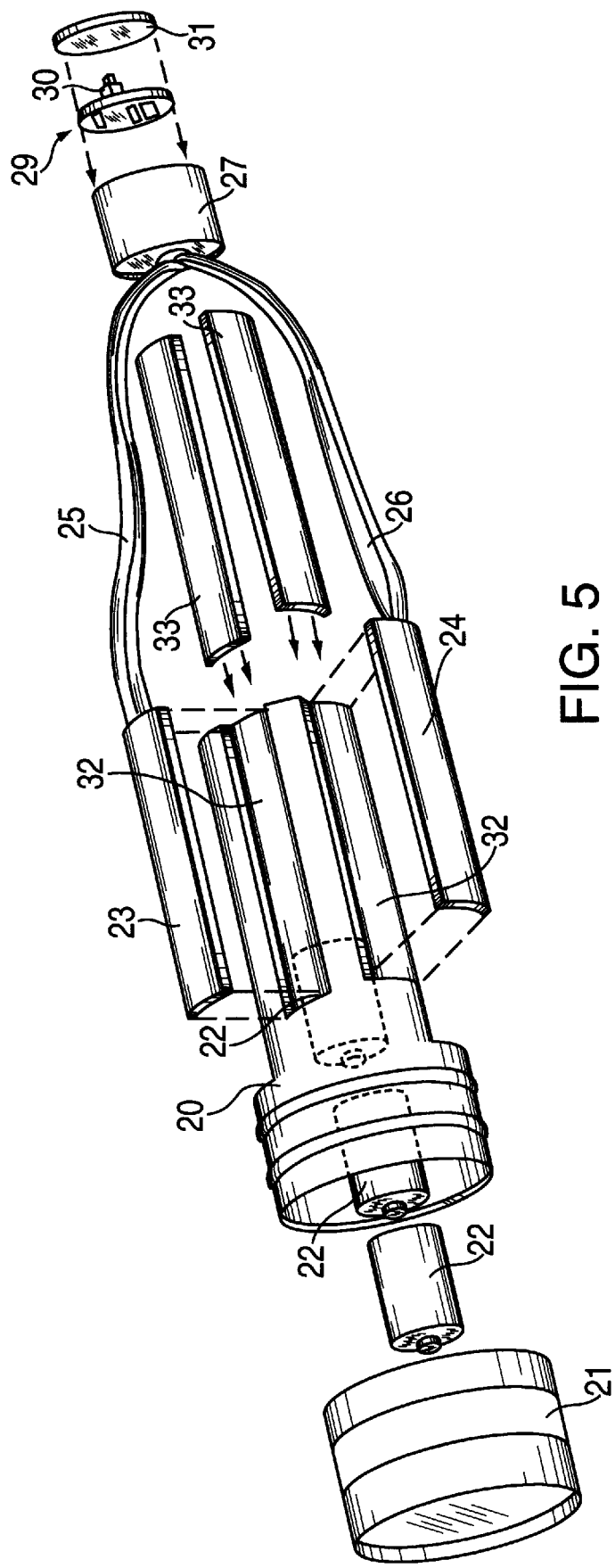
FIG. 5 is an exploded isometric view illustrating the construction of a flashlight similar to those shown in FIGS. 1–4.

FIG. 1 illustrates a flashlight constructed in accordance with the principles of a first preferred embodiment of the invention. The flashlight includes a conventional housing 1 in which are situated a conventional light source 2 and power supply (not shown). The conventional light source may be in the form of an incandescent bulb, light emitting diode, krypton, halogen, or mercury vapor lamp, fluorescent tube, cold cathode tube, or any other electrically powered lighting element, while the power supply may take the form of conventional dry cell batteries or other sources of electrical power. In addition, the housing can be made of any appropriate material, such as plastic, sheet metal, or die cast metal, and have any shape, such as the version shown in FIGS. 1A and 1B which includes a magnetic ring 3.

Mounted on the exterior of the housing, in recesses in the housing, or within transparent sections of the housing are electro-luminescent elements 4–7 of any desired shape, color, pattern, or number. The electro-luminescent elements may be in the form of panels, sheets, tubes, bars, strips, two-dimensional lighting elements, or three-dimensional lighting elements, and may be mounted at any desired location on the housing, including the head 8, main body 9, and opposite end 10. Examples of suitable electro-luminescent lighting elements include electro-luminescent panels or strips of the type disclosed in U.S. Pat. No. 5,572,817 and copending U.S. patent application Ser. Nos. 08/729,408, 08/734,872, and 08/746,706, in which attractive designs are obtained by including logos, figures, cartoon characters, words, on either a frontsheet (not shown) or the electro-luminescent element itself, either by printing, silk-screening, stencilling, or the like, and/or by appropriately arranging the phosphor segments of the electro-luminescent element. Alternatively, or in addition to electro-luminescent panels or strips, electro-luminescent lighting elements 4–7 may be in the form of three-dimensional tubes arranged in an attractive pattern in the manner described in copending U.S. patent application Ser. No. 08/758,393, and the electro-luminescent lighting arrangement disclosed herein may also be used with the optical device disclosed in U.S. patent application Ser. No. 08/841,624 (pending), also incorporated herein by reference, which is a continuation of U.S. patent application Ser. No. 08/489,160 (abandoned), and may utilize such elements of prior electro-luminescent lighting arrangements as the connector described in U.S. patent application Ser. No. 08/383,404.

Extending from the housing is a switch 11 for turning the flashlight on and off. Switch 11 can be optionally configured to select either the conventional light source, any or all of the electro-luminescent elements, or both the conventional light source and the electro-luminescent elements. Alternatively, the electro-luminescent elements could be activated by a photocell, motion sensor, timer, or any other condition-responsive switching element.

Also included in the housing (and illustrated in FIG. 5) is circuitry 29 for supplying electrical power having a sufficient voltage, current, and frequency to trigger the electro-luminescent elements, optionally including a sequencer or function interface for causing the electro-luminescent elements to turn on and off according to a selected pattern. Numerous suitable circuits are known, including a variety of conventional and integrated circuits disclosed in the copending applications and other patents of the Inventor, and it is intended that the invention encompass any circuitry to which the electro-luminescent element might be connected, or no circuitry at all, with the electrodes of the electro-luminescent elements being directly and exclusively connected to the main power source of the flashlight.

In addition to functioning as a conventional flashlight with the added convenience of being locatable in the dark, the electro-luminescent elements permit the preferred lighting device to be used for applications where a directed flashlight beam is not necessarily desirable, such as directing traffic, guiding airplanes to a terminal, for use by an usher, or serving as a beacon or warning in case of emergency, in which case the head 8 of the housing containing the light source can serve as a stand or handle.

The embodiment illustrated in FIG. 2 is similar to those of FIGS. 1, 1A, and 1B except that the pattern of electro-luminescent elements 12–14 on the housing 1 has been varied to illustrate the potential for creating attractive lighting designs or messages.

FIG. 3 shows another conventional flashlight design which has been modified to include electro-luminescent elements 15 on the back and front, and an electro-luminescent element 16 on the on/off switch. In addition to the conventional light source and electro-luminescent elements, the flashlight of this embodiment of the invention includes a low power or charging indicator device 17, which may be similar to the one described in U.S. Pat. No. 5,806,961.

FIG. 4 shows a palm type flashlight with an electro-luminescent element 18 on at least one side and a slide-type switch 19 for turning on either the conventional light or various combinations of different electro-luminescent elements with and without the conventional light source.

FIG. 5 illustrates the manner in which the flashlight of the preferred embodiments may be constructed. The illustrated flashlight includes a housing main body 20, a magnetic ring/lens assembly 21 that also serves as an on/off switch for the conventional light source (not shown), and batteries 22 situated in the housing and electrically connected to the light source in any convenient manner. The electro-luminescent elements 23 and 24, which may be of any known construction, are connected by wires 25 and 26 to trigger circuitry situated in a housing 27, which may optionally include a circuit board 28 for sequencing or lighting effects circuitry 29 of the type discussed above. As illustrated, the circuit board 28 has mounted thereon a push button switch 30 activated by a pushing a switch cover 31, although alternative switching arrangements may of course be substituted, as described above. The electro-luminescent elements 23 and 24 are positioned in grooves or recesses 32, which may be covered by lenses or optical effects devices 33 to enhance the lighting effect.

Those skilled in the art will appreciate that the electro-luminescent element and the conventional light source may be controlled separately or through a common switch or sensor, and that by circuitry is meant any electrical component, including wires, resistors, capacitors, transistors, inductors, and so forth, as well as switches of various types, including motion sensors connected to allow the electro-luminescent lighting element or elements to turn on in response to motion of persons in the area of the light, a photosensor which by way of example may be arranged to turn on the electro-luminescent lighting elements but not the conventional light source when the ambient light level is low, a timing device for turning on the electro-luminescent lighting element or the conventional light source at predetermined times, an inverter for increasing the efficiency and brightness of the electro-luminescent lighting element by increasing the frequency and amplitude of the current supplied to the electro-luminescent lighting element, a dimmer switch for controlling the frequency and current supplied to the electro-luminescent lighting element in order to control its brightness, flasher or control circuits for causing multiple electro-luminescent lighting elements to exhibit special lighting effects such as chasing, random flashing, common flashing, steady on, fade/in fade/out, pair flashing, sequential flashing, or combination of such effects.

Figure 6:
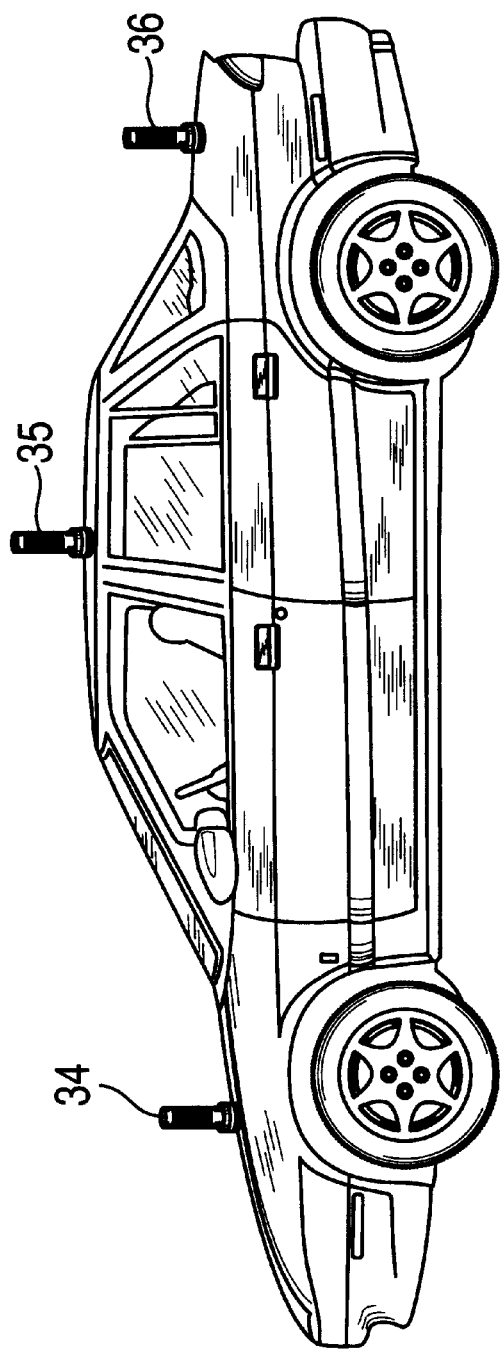
FIGS. 6–14 are isometric view showing further variations of the flashlight illustrated in FIG. 1.

FIG. 6 shows an application of the principles of the above-described embodiments in which a plurality of flashlights 34–36 are positioned or mounted on a vehicle to serve as hazard lights or police warning lights, in which case the flashlights preferably include flasher circuitry and a base that allows the lights to rotate.

Figure 7:
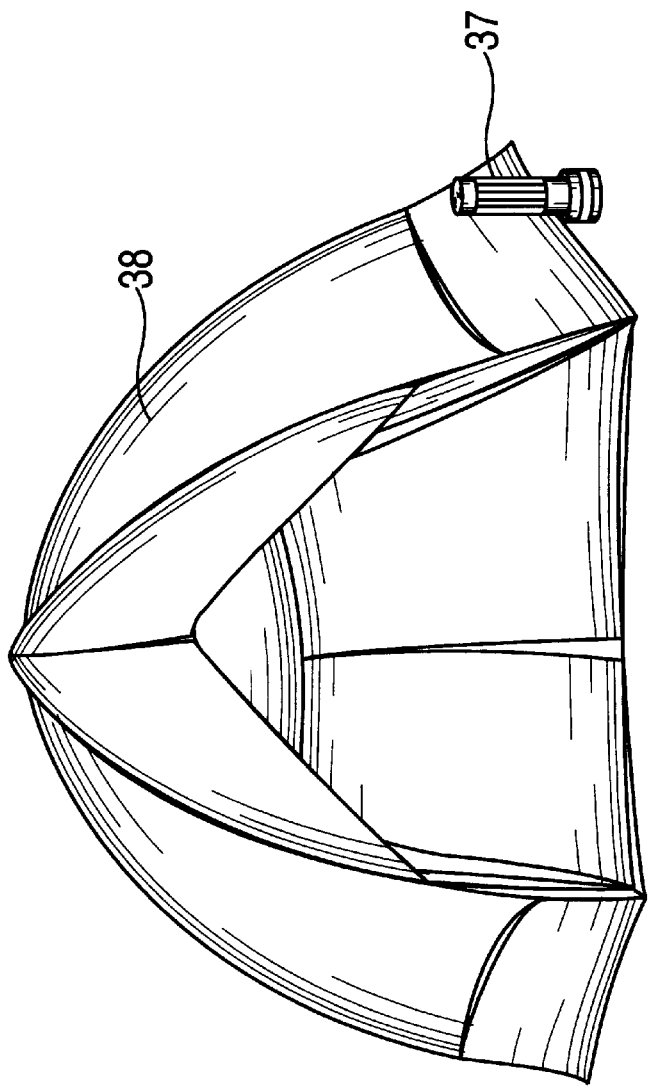

In the application illustrated in FIG. 7, a flashlight 37 of the type described above is being used as a night light for camping. Placed outside the tent 38, the same light could serve as a security or rescue light, and of course may also be utilized as an ordinary flashlight by turning on the conventional light source.

Figure 9:
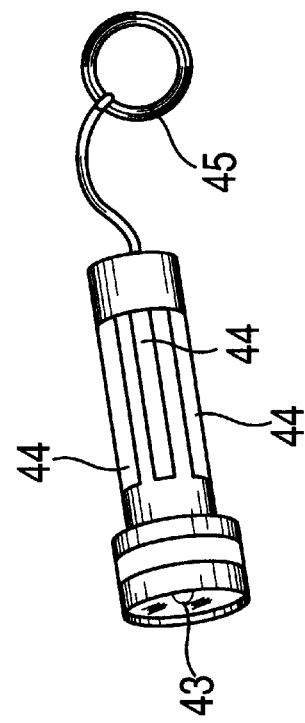
Figure 8:
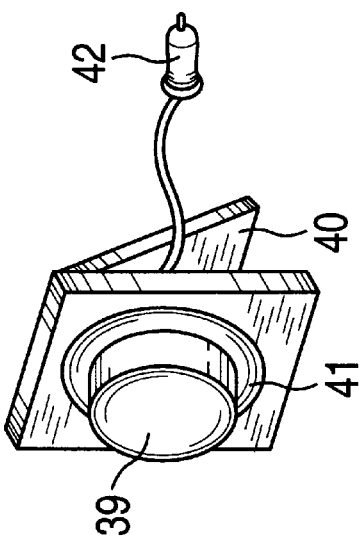
Figure 11:
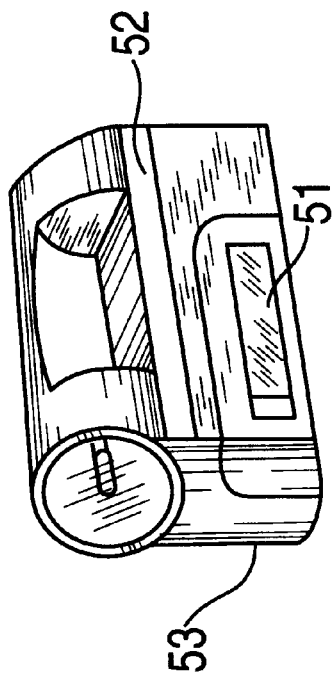
Figure 10:
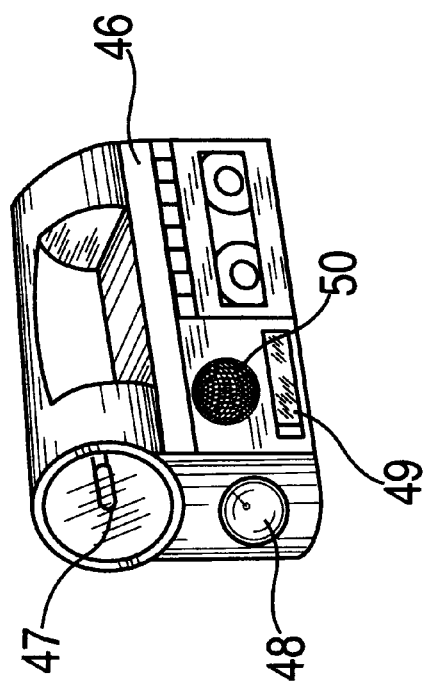

In the application illustrated in FIG. 8, the flashlight is in the form of a hand-held light with a conventional project or work light source 39, a stand 40, electro-luminescent element 41, and an adapter 42 for a automobile lighter plug, solar power supply, or other external electrical source, while in the application illustrated in FIG. 9, a key chain type flashlight includes an LED bulb 43, electro-luminescent elements 44, and a key chain 45. In the application illustrated in FIG. 10, the flashlight to which the electro-luminescent elements 46 are applied is a lantern type flashlight with a conventional light bulb 47, air compressor outlet 48, fluorescent tube 49, and speaker 50 for a radio, tape player, alarm clock, or the like. The lantern type flashlight of FIG. 11 includes a fluorescent tube 51, electro-luminescent element 52, and an additional device such as a tire pump, tire pressure gauge, or battery charger 53.

Figure 12:
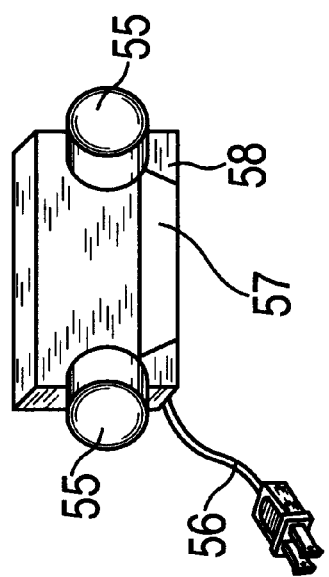

FIG. 12 illustrates an application similar to that disclosed in the above-cited copending U.S. patent application Ser. No. 09/158,503, in which a conventional spot or torch light 55 includes a power cord 56 to be plugged into a wall outlet, and a battery-powered electro-luminescent element 57 is mounted on the housing 58 of the device and connected to a power fail circuit to cause the electro-luminescent element to illuminate in case of a power failure.

Figure 13:
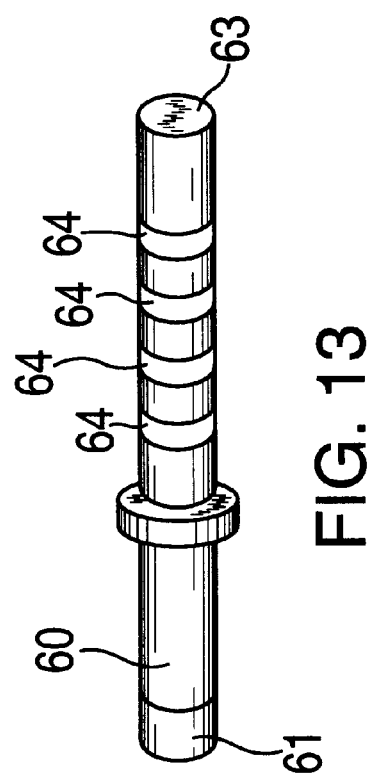

FIG. 13 shows a traffic control baton which can also be used as a flashlight. The baton illustrated in FIG. 13 includes a handle 60, a piezo-electric alarm or speaker 61, a flashlight main body, conventional light source 63, and electro-luminescent elements 64 on the flashlight main body.

Figure 14:
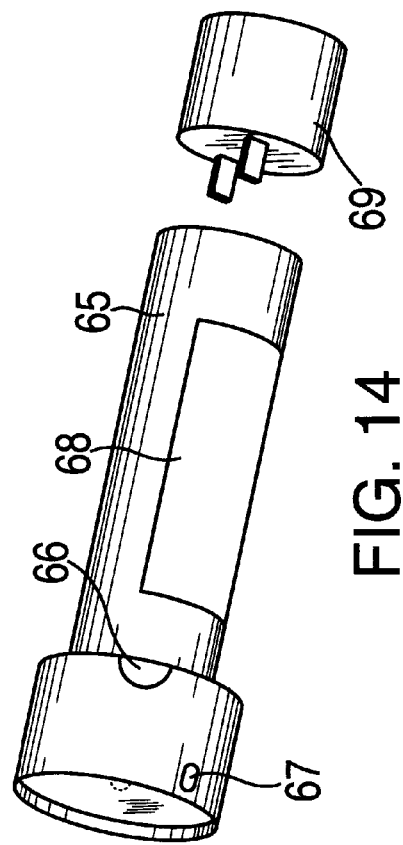

Finally, FIG. 14 shows a flashlight having a main body, a switch 66, a charging indicator bulb 67, and an electro-luminescent element 68. Like the embodiments shown in FIGS. 1–4, the main body houses a conventional light source and a battery accessible through a battery cover (not shown), but the flashlight of this embodiment further includes a receptacle adapter 69 which may be attached to the main body by any suitable means and prongs which are electrically connected to the electro-luminescent element 68 to provide a night light function when the adapter 69 is attached to the housing and plugged into a wall outlet. At the same time, adapter may also be electrically connected to charge the batteries of the flashlight, with bulb 67 providing an indication that the battery is being charged.

Having thus described preferred embodiments of the invention and a number of different variations and modifications of the preferred embodiment, it is anticipated that still further variations and modifications will undoubtedly occur to those skilled in the art upon reading the above description, and it is therefore intended that the invention be interpreted solely in accordance with the appended claims.

I claim:

1. A flashlight, comprising:
    a flashlight housing;
    a flashlight lighting element positioned in the housing and connected to a power supply through a switch;
    at least one electro-luminescent element on the housing, said electro-luminescent element being in addition to said flashlight lighting element; and
    conductive means for electrically connecting the electro-luminescent element to said power supply.
2. A flashlight as claimed in claim 1, wherein said flashlight lighting element is a lighting element selected from the group consisting of an incandescent bulb, a light emitting diode, a fluorescent tube, a krypton bulb, a halogen bulb, a mercury vapor lamp, a xenon flash tube, a cold cathode tube, and combinations of different lighting elements.

3. A flashlight as claimed in claim 1, wherein the electro-luminescent lighting element is selected from the group consisting of panels, sheets, tubes, bars, strips, two-dimensional lighting elements, and three-dimensional lighting elements.

4. A flashlight as claimed in claim 1, further comprising means for causing the electro-luminescent lighting elements to turn on and off at predetermined times.

5. A flashlight as claimed in claim 1, wherein said flashlight lighting element and said electro-luminescent element are controlled by separate switches or sensors.

6. A flashlight as claimed in claim 1, wherein said flashlight lighting element and said electro-luminescent element are controlled by a common switch or sensor.

7. A flashlight as claimed in claim 1, further comprising an additional lighting element connected to said conductive means for indicating a condition of the power supply.

8. A flashlight as claimed in claim 1, wherein said conductive means further comprises inverter circuitry which forms a means for triggering the electro-luminescent element to exhibit desired brightness, color, and other lighting functions.

9. A flashlight as claimed in claim 1, wherein said flashlight further includes a device selected from the group consisting of a radio, a clock, a tape player, an air compressor, a tire pressure gauge, and a battery charger.

10. A flashlight as claimed in claim 1, further comprising a chain, string, or wire arranged as a carrying element.

11. A flashlight as claimed in claim 1, further comprising an adapter for connecting the flashlight to another power source.

12. A flashlight as claimed in claim 1, further comprising additional electro-luminescent elements.

13. A flashlight as claimed in claim 1, further comprising additional light sources.

14. A flashlight as claimed in claim 1, wherein said flashlight is arranged to function as both a flashlight and a traffic control baton.

15. A flashlight as claimed in claim 1, wherein said flashlight is arranged to function as both a flashlight and as an automotive accessory.

16. A flashlight as claimed in claim 1, wherein said flashlight is arranged to function as both a flashlight and a camping light.

17. A flashlight as claimed in claim 1, wherein said flashlight includes an adapter arranged to plug into a wall outlet and thereby provide a low power night light function.

18. A flashlight as claimed in claim 17, wherein the adapter is removable and said flashlight is arranged to operate with and without said adapter.

19. A flashlight as claimed in claim 1, wherein said flashlight is arranged to function as both a flashlight and a low power, low intensity area light.

20. A flashlight as claimed in claim 1, further comprising a removable adapter and wherein said flashlight is arranged to operate with and without said adapter.

* * * * *